Jan. 27, 1959 S. ZISLER ET AL 2,871,472
ARRANGEMENT FOR CONTROLLING RADAR SYSTEMS
Filed Feb. 20, 1956
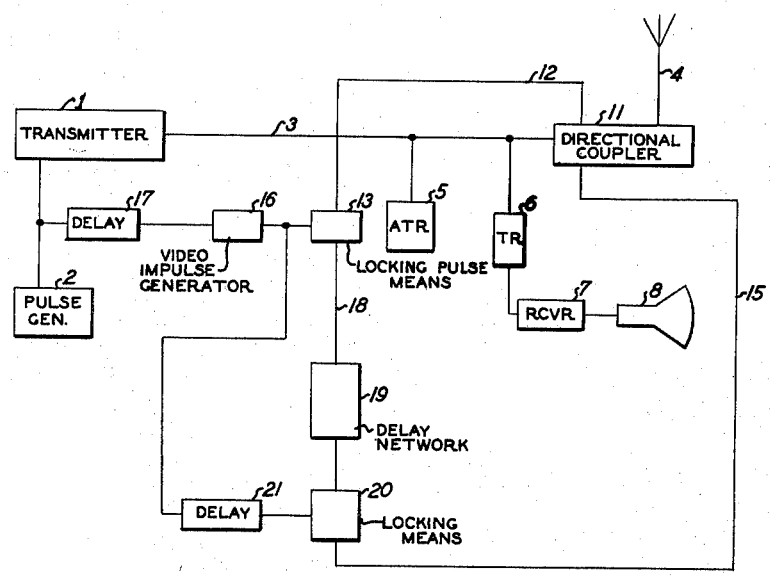
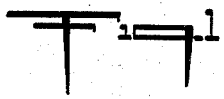
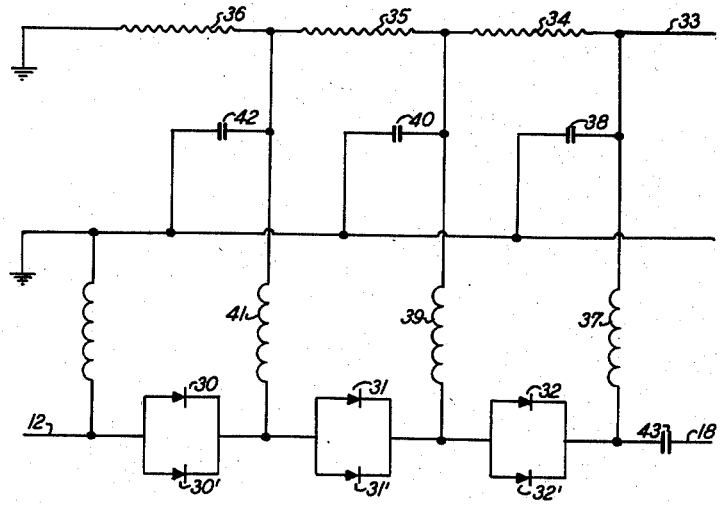
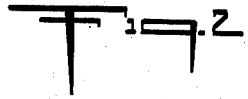

United States Patent Office 2,871,472
Patented Jan. 27, 1959

2,871,472
ARRANGEMENT FOR CONTROLLING RADAR SYSTEMS

Siegfried Zisler, Bievres, and Gérard Dubost, Paris, France, assignors to Societe Francaise Sadir-Carpentier, Paris, France, a corporation of France Application February 20, 1956, Serial No. 566,716

Claims priority, application France March 18, 1955

3 Claims. (Cl. 343—17.7)

Our invention has for its object an arrangement for controlling the proper operation of a radar transmitter and of the associated receiver.

It is a well known fact that it is of considerable interest to make sure at every moment during the operation of a radar system that the transmitter of the latter operates under its normal power conditions while on the other hand the receiver is tuned accurately to the frequency of the transmitter.

As a matter of fact, when such a control system is not provided, the absence of an echo does not prove by any means that there is no target which should normally have been detected, since it is possible that at certain moments the transmitter operates under reduced power conditions or else the receiver is out of tune or out of order.

Our invention consists in providing a permanent control system the operation of which leads to the appearance of a fictitious echo showing that that tranmitter and the reciver are actually operative, said control system allowing also if required tuning the receiver when out of tune.

It has already been proposed to produce fictitious echos in particular through a so-called echo-box, i. e. a resonant cavity with very small losses, said echo-box oscillating at its natural frequency and having a quality factor, which is sufficiently high for the oscillations to persist for a longer time than the time required for the desensitizing of the receiver whereby, when this time has elapsed, the oscillations of the cavity are amplified by the receiver and produce an indication on the screen, which indication proves the whole radar system is in proper operative condition.

The echo-box is a cavity adapted to oscillate at its natural frequency and it is consequently impossible to use it with a view to following premanently without any adjustment the modifications in frequency of the transmitter or to controlling the sensitivity of the entire system.

Out invention allows controlling in a continuous manner during operation the working condition of the transmitter and the tuning of the receiver.

We obtain this result by tapping off a fraction of the high frequency radiating energy, by delaying it through a duration at least equal to the time required for resensitizing the receiver and by transmitting the impulse thus delayed to the receiver, preferably through the coupling means between the transmitter and the receiver, which allows checking the proper operation of these coupling means.

In the practical embodiments of this method, we have designed various arrangements for obtaining a delayed impulse having a sufficient energy, while tapping the least amount possible of energy off the radiated impulse; these arrangements are as follows:

(1) There is first cut off from the radiated impulse of a duration $\theta$ a front fraction of a duration $\theta_1$ so that the impulse is reduced to a duration $\theta-\theta_1$, the rear edge of which coincides with the rear edge of the transmitted impulse.

According to an important feature of our invention, the arrangement cutting off at the start the front fraction of the transmitter impulse is constituted by locking means which establish a connection between the transmitter and the high frequency delay network following it only with a delay equal to $\theta_1$.

(2) This impulse of a duration $\theta-\theta_1$ is injected into a high frequency delay network with low losses, so as to produce a total delay $\theta_2$.

(3) With a view to obtaining a delay of a duration $\theta_2$ through a single travel of the wave over said network, one may be led in certain cases to a prohibitive length for the latter. Consequently and in accordance with another feature of our invention, we resort to reflections at each end of the network so as to make the impulse travel over a plurality of reciprocatory paths whereby it is possible to use a network, the electric length of which is such that it produces a delay $\theta_3$, the impulse travelling $k$ times forwardly and $k-1$ times in the opposite direction. This leads obviously to $$\theta_2 = k\theta_3 + (k-1)\theta_3 = (2k-1)\theta_3$$

(4) In order to reach this result and in accordance with a still further feature of our invention, the output end of the delay network is connected with further locking means designed in a manner such that said output end shows a very large impedance during the successive reflections of the wave after which the said locking means are released and allow the high frequency impulse which has been thus delayed by a total duration $\theta+\theta_2$ to pass. The delayed impulse is then transmitted to the receiver preferably through the agency of the transmission and reception coupling arrangement so as to provide also for a checking of the correct operation of said coupling means.

In order to provide a delay network transmitting the high frequency wave with sufficiently low losses, we resort in accordance with a further feature of our invention to a delay network using a ceramic material as a dielectric. Such a network may be constituted for instance in accordance with our prior patent application Ser. No. 485,692 filed on February 2, 1955, now abandoned, and entitled "Improved Delay Networks."

Further features of our invention will appear in the reading of the following specification describing by way of exemplification a particular embodiment of said invention as illustrated in accompanying drawings, wherein:

Fig. 1 is a wiring diagram of the control system associated with the transmitter and with the receiver of a radar network.

Fig. 2 is a wiring diagram of the locking means at the output end of the delay network.

In Fig. 1, 1 designates the radar transmitter; the impulses of the radiated high frequency wave are released under the control of a generator 2 producing impulses at the frequency of repetition of the impulses. The high frequency wave impulses are transmitted through the line 3 to the aerial 4, while 5 designates the anti-TR tube system, 6 the TR system, 7 the receiver with its indicator tube 8.

In accordance with our invention, the control system is executed as follows:

A directional coupler 11 is inserted in a section of the line 3 between the transmitter 1 and the aerial 4. This coupler is such that only a fraction of the energy transmitted is tapped off and fed into the line 12 towards the locking means 13. The latter is under control of a video impulse generator 16 producing impulses of a duration $\theta-\theta_1$, said impulse generator being triggered through the impulses produced by the generator 2. The impulse generator 16 operates with a delay $\theta_1$ as provided by the delay network 17 which introduces this delay by such a duration $\theta_1$, said delay network being inserted as illustrated in the connection between the generators 2 and 16.

The locking means 13 are designed so as to remain locked as long as the generator 16 produces no impulses. Consequently, the whole front portion of each impulse, produced by the radar transmitter 1, is cut off and only the rear portion of said impulse, the duration of which portion is equal to $\theta-\theta_1$ is transmitted from the line 12 to the line 18 through the locking means 13. Last mentioned line 18 is connected with the input of a high frequency delay network 19 of the ceramic type referred to hereinabove and providing a delay for a single travel through it by a duration $\theta_3$. The output of said line 18 is connected with further locking means 20. Said second locking means 20 are controlled through the impulses sent into it by the impulse generator 16, through a further delay network 21, the structure of which is similar to that of the delay network 17 and which produces a delay $\theta_2$. The output of the locking means 20 is connected with the line 15. As long as the locking means 20 are operative, they show a great impedance which is much higher than the characteristic impedance of the network so that the incoming waves are reflected. Since the locking means 13 are operative, it is apparent that, as long as the impulse produced by the generator 16 and delayed by 21 is not introduced into said locking means 20, the delay network 19 has its two ends practically switched off during the time $\theta_2$ so that the high frequency wave injected into it is reflected a number of times at each end of said network.

Experience shows that it is possible to produce a ceramic network wherein the wave thus reflected which has executed $k$ forward travels and $(k-1)$ return travels, $k$ being equal to 2 or 3, is subjected to losses which are small enough for the amplitude of said wave to remain capable of actuating the radar receiver 7 after it has passed through the locking means 20 when released and thence, through the line 15, the directional coupler 11 and the TR system 6.

The following parts: the directional coupler 11, the delay networks 17 and 21 and the impulse generator 16 are of a conventional type well known in the art; it is therefore unnecessary to describe them with any further detail. The ceramic delay network 19 is preferably a line the dielectric of which is constituted by ceramic material producing extremely low losses under high frequency conditions, which allows obtaining the desired delay with a satisfactory energetic balance.

We will describe now the two locking means 13 and 20 to be used by way of preference. As a matter of fact and in accordance with a further feature of our invention, the locking means 13 are constituted preferably by rectifying cells which, when inoperative, are biased in a manner such that they prevent the waves from passing through them. The impulses produced by the generator 16 are adapted to modify said biasing and allow thus the rectifying diodes to become conductive. By reason of the limit voltages and intensities which the diodes are capable of supporting, it is necessary to insert several cells in parallel and in series connection.

Consequently, the locking means 13 are preferably executed as indicated in Fig. 2 by inserting three pairs of rectifying cells in series. These pairs of parallel cells are shown at 30—30', at 31—31' and at 32—32'. The line 12 is connected with that end of this series of cell pairs, which is constituted as shown by the cells 30—30', while the other end of the series is connected with the line 18 through the condenser 43 as illustrated. The cells 30—30' are arranged in parallel as also the cells 31—31' and the cells 32—32'.

The releasing action on the locking means 13 is obtained through the impulses fed by the generator 16. These impulses are applied to the lead 33 connected with one of the output terminals of said impulse generator 16, the other output terminal of which is grounded.

The voltage fed by the generator 16 is thus fed to three resistances 34, 35 and 36 inserted in series between the lead 33 and ground. Said lead 33 is connected also with those ends of the cells 32—32', which are connected with the line 18, through a choke coil 37 adapted to stop high frequency oscillations, a de-coupling condenser 38 being inserted between ground and the lead 33. Similarly, the common point between the pairs of cells 31 and 32 is connected through a choke coil 39 with the point connecting the resistances 34—35 and also with a grounded decoupling condenser 40.

Similarly, a point of the line connecting the pairs of cells 30 and 31 is connected through a choke coil 41 with the point connecting the resistances 35 and 36 and also with a grounded decoupling condenser 42.

The above mentioned condenser 43 inserted in series between the line 18 and the corresponding ends of the cells 32 and 32' serves for preventing the passage of any direct biasing current to line 18.

The locking of the rectifier cells is obtained through a direct current voltage biasing them positively and of a suitable positive value, applied through the lead 33 to said cells.

It is apparent that, if the negative voltage of the impulse fed by the lead 33 is suitably selected, the cells 30 to 32 are locked in the absence of any impulses fed by the generator 16 and will allow the passage of the high frequency waves fed through the line 12 only during such impulses.

The locking means 20 are constituted and operate in a manner similar to the locking means 13; however, by reason of the fact that the high frequency voltage to be locked has a lesser value, it may be sufficient to resort to a single group of two cells in parallel relationship instead of three groups of such cells in series connection as in the case of the locking means 13.

Obviously, the arrangement according to our invention leads to the desired result since the energy sent into the receiver is of the same high frequency as that of the radar oscillator.

The proper operation of the arrangement is detected through the presence of a spot on the screen of the cathode ray tube 8 or in the case of a rotary beam by the presence of a circle at a predetermined distance from the centre.

Furthermore, it should be well understood that many modifications may be brought to the embodiment described within the scope of the invention as defined in accompanying claims.

What we claim is:

1. An arrangement for controlling a radar system including a transmitter and a receiver, said arrangement including means for diverting a small fraction of the high frequency impulses produced by the transmitter, means for cutting off the front of each of the impulses of the fraction thus diverted, a high frequency delay network fed by last mentioned means and adapted to delay the said diverted fraction by a duration equal at least to the duration of desensitizing of the receiver and means wherethrough said delay network feeds the receiver.

2. An arrangement for controlling a radar system including a transmitter and a receiver, said arrangement including means for diverting a small fraction of the high frequency impulses produced by the transmitter, a high frequency delay network fed by said means, an impulse generator, a first delay network connecting the latter with the transmitter to make said impulse generator produce impulses in synchronism with the transmitter with a predetermined delay between the starting of its impulses and that of the transmitter impulses, the rear edges of the impulses of the generator and of the transmitter being synchronous, two locking means at the input and at the output ends respectively of the first mentioned delay network, means wherethrough the impulse generator controls the first mentioned delay network during the impulses produced by the impulse generator, a further delay network operatively inserted between the impulse generator and the second locking means to constrain the impulses fed into said first delay network during the release of the first locking means to execute an odd number of progressions therein until the second locking means are released in their turn, and means through which the output of the first delay network feeds the receiver with the delayed impulses upon release of the second locking means.

3. An arrangement for controlling a radar system including a transmitter and a receiver, said arrangement including means for diverting a small fraction of the high frequency impulses produced by the transmitter, a high frequency delay network fed by said means, an impulse generator, a first delay network connecting the latter with the transmitter to make said impulse generator produce impulses in synchronism with the transmitter with a predetermined delay between the starting of its impulses and that of the transmitter impulses, the rear edges of the impulses of the generator and of the transmitter being synchronous, two locking means at the input and at the output ends of the first mentioned delay network, each locking means including a number of interconnected rectified cells, means wherethrough the impulse generator, when inoperative biases said cells into cut off conditions and, when operative, restores the conductivity of the cells, a further delay network operatively inserted between the impulse generator and the second locking means to constrain the impulses fed into said first delay network during the release of the first locking means to execute an odd number of progressions therein until the second locking means are released in their turn, and means through which the output of the first delay network feeds the receiver with the delayed impulses upon release of the second locking means.

References Cited in the file of this patent
UNITED STATES PATENTS 2,532,539     Counter et al. _____ Dec. 5, 1950